(No Model.)

G. L. WILEY.
CABLE HANGER.

No. 355,492. Patented Jan. 4, 1887.

WITNESSES:
C. M. Clarke
R. H. Whittlesey

INVENTOR,
George L. Wiley
by Darwin S. Wolcott
Att'y.

N. PETERS. Photo-Lithographer, Washington, D. C.

UNITED STATES PATENT OFFICE.

GEORGE LOWRIE WILEY, OF BROOKLYN, NEW YORK, ASSIGNOR TO THE STANDARD UNDERGROUND CABLE COMPANY, OF PITTSBURG, PA.

CABLE-HANGER.

SPECIFICATION forming part of Letters Patent No. 355,492, dated January 4, 1887.

Application filed June 19, 1886. Serial No. 205,615. (No model.)

*To all whom it may concern:*

Be it known that I, GEORGE LOWRIE WILEY, residing at Brooklyn, in the county of Kings and State of New York, a citizen of the United States, have invented or discovered certain new and useful Improvements in Cable-Hangers, of which improvements the following is a specification.

Figure 1:
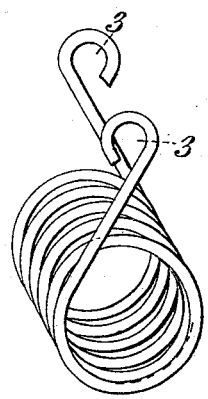
Figure 2:
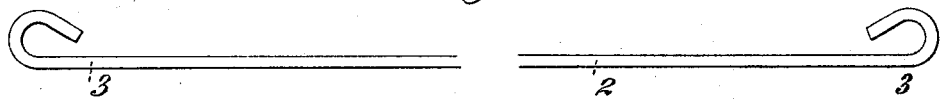
Figure 3:
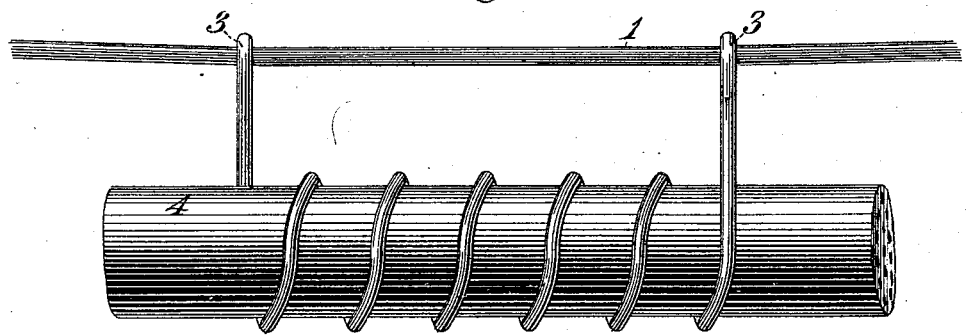

In the accompanying drawings, which make part of this specification, Figure 1 is a perspective view of my improved hanger for aerial telegraph and telephone cables. Fig. 2 is a view of a hanger-blank. Fig. 3 is a view in side elevation of a section of aerial cable, the sustaining-wire, and the hanger, showing the manner of applying the hanger.

The invention herein relates to certain improvements in hangers or supports for aerial cables. It is necessary on account of the flexibility of the cables that they should be supported at frequent intervals, and it is also necessary that the hangers should be so constructed as to permit of their easy removal from one suspending-wire and connection with another, as the unprotected suspending-wires are rapidly weakened and destroyed, necessitating frequent renewals. In providing for the ready removal of the hangers from one wire to another it is necessary to guard against their accidental detachment from the suspending-wire by the swinging of the cable; and, further, the hangers should have sufficient bearing along the cable to avoid cutting into the protective covering of the cable.

In general terms the invention consists in such a construction and combination of parts as will effect the purposes above mentioned, substantially in the manner hereinafter more fully described and claimed.

In hanging cables with my improved hanger, a suspending-wire, as 1, is first strung along poles in a manner similar to that employed in erecting telegraph or other electrical lines. A number of wires, 2, of suitable length are then prepared by forming oppositely-facing hooks 3 at each end, as shown in Fig. 2. One end of one of these blanks is then hooked over the suspending-wire, and the body portion thereof is then wrapped around the cable 4, which is held in any convenient manner in proper relation to the suspending-wire. The opposite end of the wire blank is then hooked onto the sustaining-wire, care being taken that the hooks, when in engagement with the sustaining-wire, should face in opposite direction, so that both hooks may not be simultaneously disengaged from the sustaining-wire by the swaying of the cable.

These hangers are preferably formed of annealed wire, and of such thickness that one part of the hanger will be sufficiently strong to sustain the cable at the point where the hanger is applied, and a sufficient number of convolutions or wraps should be made about the cable, to prevent an entire disengagement of the hanger from the cable in case one of the hooked ends should be accidentally unhooked.

I am aware that conducting wires or cables have been connected to suspending-wires by means of a wire, one end of which engages the suspending-wire either through the medium of a hook or several convolutions around the suspending-wire, the opposite end of the hanger-wire similarly engaging the conducting wire or cable; but I am not aware that a hanger having both of its ends engaging the suspending-wire and its central portion wound around the conducting wire or cable has ever been employed.

I claim herein as my invention—

1. The combination of a conducting wire or cable, a suspending-wire, and a hanger provided at its ends with hooks engaging the suspending-wire, and its intermediate portion wrapped two or more times around the conducting wire or cable, substantially as set forth.

2. The combination of a conducting wire or cable, a suspending-wire, and a hanger provided at its ends with hooks engaging the suspending-wire in opposite directions, and its intermediate portion wrapped two or more times around the conducting wire or cable, substantially as set forth.

In testimony whereof I have hereunto set my hand.

GEORGE LOWRIE WILEY.

Witnesses:
JAS. W. HALE,
C. F. COWPERTHWAIT.